United States Patent [19]
Pfeifer

[11] 4,433,137
[45] Feb. 21, 1984

[54] TRANSPARENT POLYAMIDE FROM BRANCHED CHAIN ARYLENE DIAMINE

[75] Inventor: Josef Pfeifer, Therwil, Switzerland

[73] Assignee: Ciba-Geigy Corporation, Ardsley, N.Y.

[21] Appl. No.: 387,118

[22] Filed: Jun. 10, 1982

[30] Foreign Application Priority Data

Jun. 19, 1981 [GB] United Kingdom ............... 8119013

[51] Int. Cl.³ .............................................. C08G 69/26
[52] U.S. Cl. .................................. 528/348; 528/183; 528/337; 528/342; 528/349
[58] Field of Search ............... 528/349, 183, 337, 348, 528/342

[56] References Cited

U.S. PATENT DOCUMENTS

| | | | |
|---|---|---|---|
| 2,497,673 | 2/1950 | Kirk | 528/349 |
| 3,776,890 | 12/1973 | Lee | 260/78 R |
| 4,024,185 | 5/1977 | Lee | 260/563 B |
| 4,130,579 | 12/1978 | Frazer et al. | |

OTHER PUBLICATIONS

L. T. C. Lee, J. Polymer Science, Poly Sci Ed., 16, 2025 (1978).

*Primary Examiner*—Harold D. Anderson
*Attorney, Agent, or Firm*—Luther A. R. Hall

[57] ABSTRACT

New transparent polyamides consisting of recurring structural elements of formula I

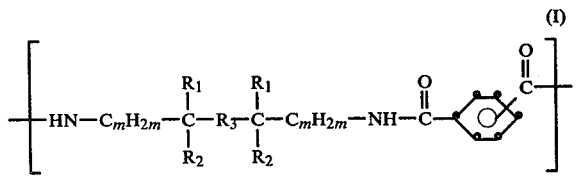

wherein the carbonyl groups are linked to the benzene ring in 1,3- and/or 1,4-position are described. The novel polyamides are suitable for the manufacture of transparent shaped articles, and are distinguished by good thermoplastic processing characteristics, low water absorption, high stability to hydrolysis and good dimensional stability under the action of moisture.

6 Claims, No Drawings

TRANSPARENT POLYAMIDE FROM BRANCHED CHAIN ARYLENE DIAMINE

This invention relates to new transparent polyamides, processes for producing them and their use for the manufacture of shaped articles.

U.S. Pat. Nos. 3,776,890 and 4,024,185 disclose polyamides from 2-(4-aminocyclohexyl)-1,1-dimethylethylamine or 2-(4-aminophenyl)-1,1-dimethylethylamine and aliphatic, aromatic or aliphatic-aromatic dicarboxylic acids or amide-forming derivatives thereof. These polyamides are part crystalline. They absorb considerable amounts of water and are not wholly satisfactory with regard to stability to hydrolysis and/or dimensional stability under the action of moisture, in consequence of which also the mechanical and electrical properties of these polyamides are impaired. Furthermore, the glass transition temperatures of these polyamides are greatly dependent on moisture, and polyamides from the aforementioned diamines and aromatic dicarboxylic acids or amide-forming derivatives thereof cannot be processed from the melt [cp. also Journal of Polymer Science: Polymer Chemistry Edition, vol. 16, 2025–2038 (1978)].

The present invention provides new transparent polyamides which are distinguished by improved thermoplastic processing characteristics, are resistant to boiling water and which further have a low water absorption, high stability to hydrolysis, good dimensional stability under the action of moisture, and correspondingly improved mechanical and electrical properties.

The novel polyamides according to the invention have a reduced specific viscosity (in the following referred to also as reduced solution viscosity) of at least 0.3 dl/g, preferably about 0.5 to about 2.0 dl/g, and particularly about 0.7 to about 1.8 dl/g, measured on a 0.5% solution in m-cresol at 25° C., and having recurring structural elements of formula I

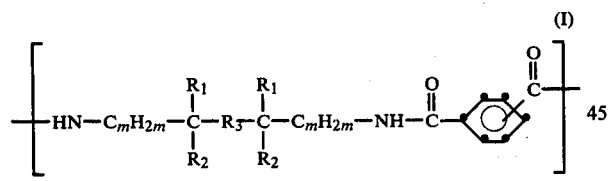
(I)

wherein
the two m independently of each other are an integer of from 4 to 16
the two $R_1$ independently of each other are $C_{1-3}$ alkyl,
the two $R_2$ independently of each other are $C_{1-6}$ alkyl and
$R_3$ is 1,4-phenylene or

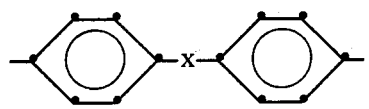

wherein
X is the direct bond, —$CH_2$—, —O—, —S— or —NH—, and whereby the carbonyl groups are linked to the benzene ring in 1,3- and/or 1,4-position.

Preferably, the two m have the same meaning, the two $R_1$ represent identical alkyl groups and the two $R_2$ each represent the same alkyl group.

Alkyl groups $R_1$ and $R_2$ may be straight or branched-chain. Examples of such alkyl groups are the methyl, ethyl, n-propyl, isopropyl, n-butyl, sec-butyl, n-pentyl and n-hexyl group. $R_1$ preferably represents methyl or ethyl. Preferred groups $R_2$ are alkyl groups having 1–4 carbon atoms, more particularly, methyl, ethyl and isopropyl. Groups —$C_mH_{2m}$— may also be straight or branched-chain, the branching preferably being not vicinal to the group —$C(R_1)(R_2)$—. Examples of such groups —$C_mH_{2m}$— are the tetramethylene, 4- methyltetramethylene, pentamethylene, 2,2-dimethylpentamethylene, hexamethylene, heptamethylene, octamethylene, nonamethylene, 9-methylnonamethylene, 9-ethylnonamethylene, 9-isopropylanonamethylen, decamethylene, 10-methyldecamethylene, 10-ethyldecamethylene, 10-isopropyldecamethylene, undecamethylene, dodecamethylene, tridecamethylene, tetradecamethylene, pentadecamethylene and hexadecamethylene group. Preferred groups —$C_mH_{2m}$— are those of formulae —$(CH_2)_3$—$CH(CH_3$toms.

Preferred polyamides are those consisting of recurring structural elements of formula I wherein the $R_1$ are each methyl or ethyl, the $R_2$ are each $C_1$-alkyl, especially methyl, ethyl or isopropyl, the —$C_mH_{2m}$— are each —$(CH_2)_3$—$CH(CH_3)$—, —$(CH_2)_8$—$CH(R_4)$— or $(CH_2)_9$—$CH(R_4)$— wherein the group —CH— is linked to the nitrogen atom and $R_4$ is $C_{1-4}$ alkyl, especially isopropyl, $R_3$ is 1,4-phenylene or a group

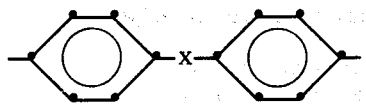

wherein X is the direct bond, —$CH_2$—, —O— or —NH—. Particularly preferred are polyamides consisting of recurring structural elements of formula I wherein the $R_1$ are each methyl, the $R_2$ are each methyl of ethyl, the —$C_mH_{2m}$— are each —$(CH_2)_3$—$CH(CH_3)$—,

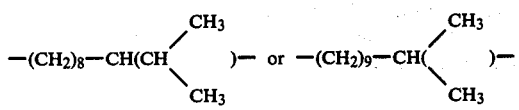

and $R_3$ has the aforementioned preferred meaning. In these preferred embodiments, the carbonyl groups are linked to the benzene ring either in 1,3— or 1,4-position.

The polyamides according to the invention can be produced by reacting a diamine of formula II

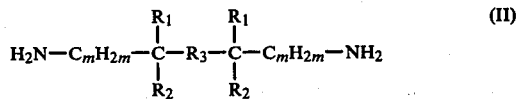
(II)

wherein m, $R_1$, $R_2$ and $R_3$ have the meanings given under formula I with isophthalic and/or terephthalic acid or amide-forming derivatives thereof. Suitable amide-forming derivatives of isophthalic or terephthalic acids are, e.g., the corresponding dinitriles or dialkyl esters having 1 to 4 carbon atoms in each alkyl group. Use of the free acids is, however, preferred.

Production by the melt-polycondensation process in several stages is preferred. The diamines are in this case pre-condensed with essentially stoichiometric amounts of iso- and/or terephthalic acid, in a closed vessel, optionally with the addition of water, under an inert gas and at temperatures of between about 240° and 290° C. It can be advantageous under certain circumstances to use the diamines and the dicarboxylic acids as salts; it is particularly advantageous to use terephthalic acid in the form of the salt.

The salts to be used for pre-condensation are produced from essentially stoichiometric amounts of terephthalic or isophthalic acid and a diamine of formula II in a suitable inert organic solvent. Suitable inert organic solvents are for example: cycloaliphatic alcohols, such as cyclopentanol and cyclohexanol, and especially aliphatic alcohols having up to 6 carbon atoms, such as methanol, ethanol, n-propanol, butanols, pentanols and hexanols, and also mixtures of such solvents with water. The pre-condensate can be subsequently further condensed at a temperature of between about 260° and 300° C., under normal pressure and in an inert gas atmosphere, until the polyamides according to the invention have been formed. It can be of advantage under certain circumstances to apply a vacuum after completion of polycondensation in order to degas the polyamide.

The copolyamides according to the invention can be produced also by melt-polycondensation of diamines of formula II with essentially stoichiometric amounts of an activated ester of isophthalic or of terephthalic acid or of mixtures thereof. Suitable activated esters are in particular the corresponding diphenyl esters. The reaction temperatures are in general between about 230° and 300° C.

The polyamides according to the invention can further be produced in a manner known per se, by interfacial surface polycondensation of diamines of formula II with isophthalic and/or terephthalic acid halides, especially the corresponding dichlorides.

Customary additives, such as heat and light stabilizers, antioxidants, dyes, flameproofing agents, and the like, can be added to the polyamides according to the invention, either during production or during processing.

The diamines of formula II are new. They can be produced by reacting, in the presence of a Friedel-Crafts catalyst, a compound of formula III

R₃Z₂      (III)

where Z is a replaceable hydrogen and R₃ has its previous significance, with at least two moles of an aminoalcohol or an amino-olefin, or a salt thereof with an organic or inorganic acid IV, capable of replacing two hydrogen atoms in the compound of formula III by a group of formula V

—C(R₁)(R₂)—CₘH₂ₘNH₂      (V).

The compound of formula IV is preferably an aminoalcohol or a salt thereof with an organic or inorganic acid, and is capable of providing, or of being converted into a residue of formula V.

The reaction catalyst may be a Broensted acid or a Lewis acid. Broensted acids suitable for this purpose are sulphuric acid, phosphoric acid or hydrochloric acid; preferred Lewis acids are metal halides, e.g. ZnCl₂, SnCl₄ or FeCl₃ and especially AlCl₃. After completion of the alkylation, the diamines of formula II may be purified and isolated in a conventional manner.

The polyamides according to the invention can be processed by methods known per se into shaped articles of the widest variety, for example by the injection-moulding process or the extrusion process. They are suitable in particular for producing transparent apparatus or parts of apparatus from the melt.

In the following Examples, parts are parts by weight, unless otherwise indicated. Pressures are given in millibars.

EXAMPLES (A) Preparation of diamines of formula II

EXAMPLE I

To a stirred solution of 256 parts 98% w/w sulphuric acid, 48 parts of methanol, and 7.8 parts of benzene, there are added at room temperature (20°–25° C.) 36.0 parts of 6-hydroxy-6-methyl-2-heptylamine hydrochloride (heptaminol hydrochloride) in 3.0 part lots every 6 hours. After the final addition at 66 hours, the reaction mixture is stirred a further 18 hours at room temperature and then diluted with water. The aqueous solution is then neutralised with sodium hydroxide solution and the organic phase is extracted with diethylether, washed with water, evaporated, and distilled to give 18.7 parts of 1,4-bis-(6-amino-2-methylhept-2-yl)-benzene, boiling point 180°–90° C. at 0.8 mb.

EXAMPLE II 15.4 parts of diphenyl are reacted with 42.0 parts of heptaminol hydrochloride according to the procedure of Example I. Distillation gives 29.0 parts of 4,4'-bis-(6-amino-2-methylhept-2-yl)-diphenyl; boiling point 220°–235° C. at 0.3 mb.

EXAMPLE III

To 8.5 parts of diphenylether and 26.7 parts of aluminium chloride in 50 parts of nitromethane are added 18.2 parts of heptaminol hydrochloride portionwise. After the addition, the reaction mixture is stored for 3 days at room temperature and then poured into water and treated with caustic soda solution until the aqueous phase is alkaline. The organic phase is extracted with diethylether, washed with water, evaporated and distilled to give 2.1 parts of 4-(6-amino-2-methylhept-2-yl)-diphenylether; boiling point 170°–80° C., at 0.4 mb followed by 14.2 parts of bis-(6-amino-2-methylhept-2-yl)-diphenylether, boiling point 240°–70° C. at 0.7 mb. Analysis of this second fraction showed it to contain 70% by weight of the 4,4'-isomer.

EXAMPLE IV 16.8 parts of diphenylmethane were reacted with 36.4 parts of heptaminol hydrochloride according to the procedure of Example 2. Distillation gave 22.4 parts of bis-(6-amino-2-methylhept-2-yl) dipehnylmethane b₀.₄mb 230°–44° C. Analysis of this fraction showed it to contain 73% of the 4,4'-isomer with the following percentage composition by weight

| | C | H | N |
|---|---|---|---|
| Found | 82.71 | 11.31 | 6.55 |
| Calculated for C₂₉H₄₆N₂ | 82.40 | 10.97 | 6.63 |

EXAMPLE V 16.9 parts of diphenylamine, 20.4 parts of 36% w/w aqueous hydrochloric acid, 6.8 parts of anhydrous zinc chloride, 36.4 parts of heptaminol hydrochloride and 20 parts of water are stirred and refluxed for 4 days. On cooling, the reaction mixture is treated with 50 parts of sodium hydroxide in 100 parts of water and the organic phase is extracted with diethylether, washed with water, evaporated and distilled. After removing 8.0 parts of a first fraction, boiling point 146°–238° C., at 0.33 mb, 29.6 parts of 4,4'-bis-(6-amino-2-methylhept-2-yl)-diphenylamine, boiling point 254°–258° C. at 0.3 mb are obtained (70% yield).

(B) PREPARATION OF POLYAMIDES

EXAMPLE 1:

In a flask fitted with stirrer, reflux condenser and dropping funnel 2.556 g (0.0154 moles) of terephthalic acid are slurried in 100 ml of 50% w/w ethanol and heated to reflux temperature. There are then introduced into the boiling reaction mixture from the dropping funnel 5.137 g (0.0154 moles) of 1,4-bis-(6-amino-2-methylhept-2-yl)-benzene. A clear solution is formed from which, after a few minutes, the salt which has formed precipitates. The salt is filtered off and dried at 80° C. in vacuo. Yield 6.5 (85% of theory). The salt is then introduced into a bomb tube fitted with a screw cover and with an incorporated pressure relief valve. After the air in the bomb has been completely expelled by nitrogen, the bomb tube is closed. It is then immersed into a salt bath having a temperature of 270° C. A clear melt has formed after a short time. After two hours the reaction is interrupted by removing the tube from the salt bath and releasing the excess pressure by opening the valve. The precondensate, which has solidified, is removed from the tube and transferred to a condensation vessel. With the strict exclusion of air and the continuous passing through of nitrogen, the melt which has formed is polycondensed at 280°. The water which forms during the polycondensation is continuously removed by the flow of nitrogen. After 5 hours the polycondensation is interrupted. On cooling, the melt solidifies into a transparent colourless mass.

2 to 3 g of the polyamide thus obtained are then moulded into an about 0.3 to 0.5 mm thick sheet by means of a heatable hydraulic press. The sheet is exposed at room temperature to a relative humidity of 65% until no further increase in weight can be detected. The reduced viscosity of the polyamide is measured on a 0.5% solution in m-cresol at 25° C.; its glass transition temperature is determined in a differential calorimeter (DCS). The results are summarized in Table 1.

EXAMPLES 2 TO 5

In a manner analogous to that of Example 1, equimolar amounts of further diamines and terephthalic acid are reacted to give the corresponding salts which are then polycondensed as described in Example 1. The following reactants are used:

EXAMPLE 2

4,4'-bis-(6-amino-2-methylhept-2-yl)-diphenyl and terephthalic acid;

EXAMPLE 3 bis-(6-amino-2-methylhept-2-yl)-diphenylether (mixture of isomers) and terephthalic acid;

EXAMPLE 4 bis-(6-amino-2-methylhept-2-yl)-diphenylmethane (mixture of isomers) and terephthalic acid;

EXAMPLE 5

4,4'-bis-(6-amino-2-methylhept-2-yl)-diphenylamine and terephthalic acid.

The properties of the resultant polyamides are determined as described in Example 1 and are summarized in Table 1.

EXAMPLES 6 TO 10

6.137 g (0.0184 moles) of 1,4-bis-(6-amino-2-methylhept-2-yl)-benzene and 3.056 g (0.0184 moles) of isophthalic acid are weighed into a bomb tube fitted with a screw cover and with an incorporated pressure relief valve. After the air in the bomb tube has been completely expelled by nitrogen, the bomb tube is closed. It is then immersed into a salt bath having a temperature of 270° C. A clear melt is formed after a short time. After two hours the reaction is interrupted by removing the tube from the salt bath and releasing the excess pressure by opening the valve. The pre-condensate which has solidified is removed from the tube and transferred to a condensation vessel. Further polycondensation is then effected at 280° C. as described in Example 1.

In analogous manner equimolar amounts of the following reactants are polycondensed:

EXAMPLE 7

4,4'-bis-(6-amino-2-methylhept-2-yl)-diphenyl and isophthalic acid;

EXAMPLE 8 bis-(6-amino-2-methylhept-2-yl)-diphenylether (mixture of isomers) and isophthalic acid;

EXAMPLE 9 bis-(6-amino-2-methylhept-2-yl)-diphenylmethane (mixture of isomers) and isophthalic acid;

EXAMPLE 10

4,4'-bis-(6-amino-2-methylhept-2-yl)-diphenylamine and isophthalic acid.

The properties of the resultant polyamides are determined as described in Example 1 and are summarized in Table 1.

TABLE 1

| Example No. | reduced solution viscosity $\eta_{red}$ dl/g | glass transition temperature Tg °C. | water absorption 65% rel. humidity wt. % |
|---|---|---|---|
| 1 | 1.13 | 135 | <1 |
| 2 | 0.72 | 158 | <1 |
| 3 | 1.59 | 137 | <1 |
| 4 | 0.70 | 140 | <1 |
| 5 | 0.68 | 141 | <1 |
| 6 | 0.81 | 126 | <1 |
| 7 | 1.21 | 142 | <1 |
| 8 |  | 130 | <1 |
| 9 | 0.97 | 121 | <1 |
| 10 | 0.62 | 132 | <1 |

What is claimed is

1. A transparent polyamide having a reduced specific viscosity of at least 0.3 dl/g, measured on a 0.5% solution in m-cresol at 25° C., and having recurring structural elements of formula I

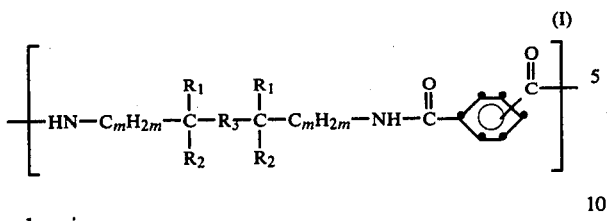

(I)

wherein
the two m independently of each other are an integer of from 4 to 16,
the two $R_1$ independently of each other are $C_{1-3}$ alkyl,
the two $R_2$ independently of each other are $C_{1-6}$ alkyl and
$R_3$ is 1,4-phenylene or

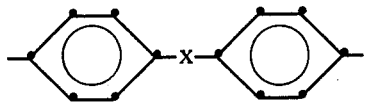

wherein
X is the direct bond, or X represents —CH$_2$—, —O—, —S— or —NH—, and whereby the carbonyl groups in the structural elements of formula I are linked to the benzene ring in the 1,3-position, 1,4- position or in mixture thereof.

2. A polyamide according to claim 1 having recurring structural elements of formula I wherein the two m are the same integer, the two $R_1$ represent identical alkyl groups and the two $R_2$ each represent the same alkyl group.

3. A polyamide according to claim 1 having recurring structural elements of formula I wherein the $R_1$ are each methyl or ethyl, the $R_2$ are each $C_{1-4}$ alkyl, the —C$_m$H$_{2m}$— are each —(CH$_2$)$_3$—CH(CH$_3$)—, —(CH$_2$)$_8$—CH(R$_4$)— or —(CH$_2$)$_9$CH(R$_4$)— wherein the group —CH— is linked to the nitrogen atom and R$_4$ is $C_{1-4}$ alkyl, $R_3$ is 1,4-phenylene or a group

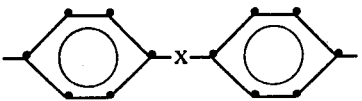

wherein X is the direct bond, or X represents —CH$_2$—, —O— or —NH—, and whereby the carbonyl groups are linked to the benzene ring either in 1,3- or 1,4-position.

4. A polyamide according to claim 1 having recurring structural elements of formula I, wherein the $R_1$ are each methyl, the $R_2$ are each methyl or ethyl, the —C$_m$H$_{2m}$— are each —(CH$_2$)$_3$—CH(CH$_3$)—,

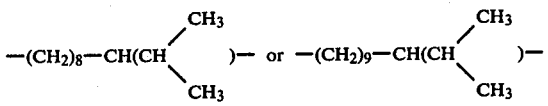

and $R_3$ is 1,4-phenylene or a group

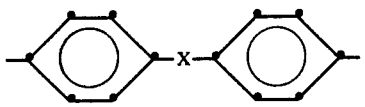

wherein X is the direct bond, or X represents —CH$_2$—, —O— or —NH—, and whereby the carbonyl groups are linked to the benzene ring either in 1,3- or 1,4-position.

5. A process for producing a transparent polyamide according to claim 1 having recurring structural elements of formula I which comprises reacting a diamine of formula II

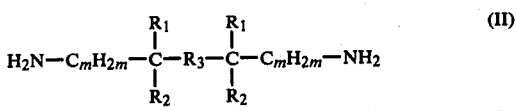

wherein m, $R_1$, $R_2$ and $R_3$ have the meanings given in claim 7, with isophthalic acid, terephthalic acid or mixture thereof, or with an amide-forming derivative of isophthalic acid, of terephthalic acid, or of a mixture thereof.

6. A shaped article of a transparent polyamide according to claim.

* * * * *